United States Patent
Hori et al.

(10) Patent No.: US 11,311,859 B2
(45) Date of Patent: Apr. 26, 2022

(54) EXHAUST GAS PURIFICATION CATALYST AND METHOD FOR MANUFACTURING EXHAUST GAS PURIFICATION CATALYST

(71) Applicant: CATALER CORPORATION, Shizuoka (JP)

(72) Inventors: Keigo Hori, Shizouka (JP); Norihiko Aono, Shizuoka (JP); Daisuke Oki, Shizuoka (JP); Yuya Kawano, Shizuoka (JP)

(73) Assignee: Cataler Corporation, Shizuoka (JP)

( * ) Notice: Subject to any disclaimer, the term of this patent is extended or adjusted under 35 U.S.C. 154(b) by 38 days.

(21) Appl. No.: 16/332,115

(22) PCT Filed: Sep. 11, 2017

(86) PCT No.: PCT/JP2017/032665
§ 371 (c)(1),
(2) Date: Mar. 11, 2019

(87) PCT Pub. No.: WO2018/047964
PCT Pub. Date: Mar. 15, 2018

(65) Prior Publication Data
US 2019/0201875 A1 Jul. 4, 2019

(30) Foreign Application Priority Data
Sep. 12, 2016 (JP) .............................. JP2016-177468

(51) Int. Cl.
*B01J 21/04* (2006.01)
*B01J 23/66* (2006.01)
(Continued)

(52) U.S. Cl.
CPC .............. *B01J 23/66* (2013.01); *B01D 53/94* (2013.01); *B01D 53/9418* (2013.01);
(Continued)

(58) Field of Classification Search
None
See application file for complete search history.

(56) References Cited

U.S. PATENT DOCUMENTS

| 4,829,044 A | * | 5/1989 | Boxhoorn | .............. B01J 23/688 502/348 |
| 5,559,072 A | | 9/1996 | Itoh et al. | |

(Continued)

FOREIGN PATENT DOCUMENTS

| CN | 101309742 A | 11/2008 |
| JP | 07-289918 | 11/1995 |

(Continued)

OTHER PUBLICATIONS

Popovych, N. O. et al. "Selective Reduction of Nitrogen Oxides (NOx) with Oxygenates . . . ". Theoretical and Experimental Chemistry . vol. 52. No. Jul. 3, 2016 (Year: 2016).*

(Continued)

*Primary Examiner* — Sheng H Davis
(74) *Attorney, Agent, or Firm* — Occhiuti & Rohlicek LLP

(57) ABSTRACT

The exhaust gas purification catalyst disclosed here is an exhaust gas purification catalyst disposed in the exhaust pipe of an internal combustion engine to purify nitrogen oxides contained in exhaust gas discharged from the internal combustion engine, provided with a silver alumina catalyst comprising at least alumina as a catalyst and silver supported on this alumina, wherein, in the silver alumina catalyst, the ratio of the peak intensity at a wave number of 1595 cm$^{-1}$ to the peak intensity at a wave number of 1613 cm$^{-1}$ by the pyridine IR method is at least 0.3, and the carried amount of the silver is 1.0 wt % to 6.0 wt % given 100 wt % as the total amount of the silver alumina catalyst.

20 Claims, 6 Drawing Sheets

(51) Int. Cl.
*F01N 3/28* (2006.01)
*B01J 37/08* (2006.01)
*B01J 23/50* (2006.01)
*B01J 23/80* (2006.01)
*B01J 37/02* (2006.01)
*F01N 3/10* (2006.01)
*B01D 53/94* (2006.01)
*B01J 37/04* (2006.01)
*B01J 35/04* (2006.01)
*F01N 3/20* (2006.01)

(52) U.S. Cl.
CPC ............... *B01J 23/50* (2013.01); *B01J 23/80* (2013.01); *B01J 35/04* (2013.01); *B01J 37/02* (2013.01); *B01J 37/0215* (2013.01); *B01J 37/04* (2013.01); *B01J 37/08* (2013.01); *F01N 3/10* (2013.01); *F01N 3/20* (2013.01); *F01N 3/2803* (2013.01); *B01D 2255/104* (2013.01); *B01D 2255/2092* (2013.01); *B01D 2255/20792* (2013.01); *B01J 21/04* (2013.01); *B01J 2523/00* (2013.01); *Y02A 50/20* (2018.01); *Y02T 10/12* (2013.01)

(56) References Cited

U.S. PATENT DOCUMENTS

| | | | | |
|---|---|---|---|---|
| 5,935,529 | A * | 8/1999 | Saito | B01D 53/9418 422/171 |
| 2005/0135980 | A1* | 6/2005 | Park | B01D 53/8628 423/239.1 |
| 2006/0228283 | A1* | 10/2006 | Malyala | B01J 23/66 423/239.1 |
| 2007/0059223 | A1* | 3/2007 | Golunski | B01J 35/0006 422/180 |
| 2010/0205935 | A1 | 8/2010 | Houel et al. | |
| 2014/0199223 | A1* | 7/2014 | Yin | B01J 23/002 423/239.1 |

FOREIGN PATENT DOCUMENTS

| | | | |
|---|---|---|---|
| JP | H0975729 | A | 3/1997 |
| JP | 09-108571 | | 4/1997 |
| JP | 3155140 | | 2/2001 |
| JP | 2005199262 | A | 7/2005 |
| JP | 2007075774 | * | 3/2007 |
| JP | 2007-196135 | | 8/2007 |
| JP | 2008-002451 | | 1/2008 |
| JP | 2010-504205 | | 2/2010 |
| JP | 2013-059721 | | 4/2013 |
| JP | 2014-113585 | | 6/2014 |
| JP | 2016-133109 | | 7/2016 |
| WO | 2007054740 | A1 | 5/2007 |
| WO | 2014169935 | A1 | 10/2014 |

OTHER PUBLICATIONS

Lundie, David et al. "Improved Description of the Surface Acidity of n-Alumina". J. Phys. Chem. B. 109, 11592-11601 (2005). (Year: 2005).*
Indonesian Office Action dated Apr. 21, 2020 in ID Application No. P00201903032.
Australian Office Action for Australian Application No. 2017/323141, dated Aug. 21, 2019.
Extended European Search Report for European Application No. 17848902.7, dated Aug. 23, 2018.
Takagi et al. *Selective Reduction of NO on Ag/Al2O3 Catalysts Prepared from Boehmite Needles.* Catalysis Today, 45, 1998, pp. 123-127.
More, et al. "Magnesia Doped Ag/Al$_2$O$_3$-Sulfur Tolerant Catalyst for Low Temperature HC-SCR of NO$_x$," Applied Catalysis B: Environmental, vol. 144: pp. 408-415, 2014.
Jagtap, et al. "Support Modification to Improve the Sulphur Tolerance of Ag/Al$_2$O$_3$ for SCR of NO$_x$ with Propene Under Lean-Burn Conditions", Applied Catalysis B: Environmental, vol. 90 No. 3-4-, pp. 416-425, 2009.
Sultana, et al. "Influence of Al$_2$O$_3$ Support on the Activity of Ag/Al$_2$O$_3$ Catalysts for SCR of NO with Decane", Catalysis Letters; vol. 114 No. 1-2, pp. 96-102, 2007.
Nortier et al. "Effects of Crystallinity and Morphology on the Surface Properties of Alumnia", Applied Catalysis; vol. 61, No. 1, pp. 141-160, 1990.
Flura, et al. "High-Surface-Area Zinc Aluminate Supported Silver Catalysts for Low-Temperature SCR of NO with Ethanol", Applied Catalysis B: Environmental, vol. 126; pp. 275-289, 2012.
Morterra, et al. "A Case Study: Surface Chemistry and Surface Structure of Catalytic Aluminas, as Studied by Vibrational Spectroscopy of Adsorbed Species", Catalysis Today, vol. 27. No. 3-4, pp. 497-532, 1996.
Morterra et al. "Infrared Study of Some Surface Properties of Boehmite ($\gamma$-AlO$_2$H)" J. Chem Soc. Faraday Trans. vol. 88. No. 3, pp. 339-348, 1992.
Hughes, et al. "Brönsted and Lewis Acid Site Concentrations in Fluorided Alumina from the Infrared Spectra of Adsorbed Pyridine Species", Journal of Catalysis, vol. 13. No. 1, pp. 58-64, 1969.
Japan Office Action, dated Jul. 8, 2021 (12 pages).
Indian Office Action dated Oct. 14, 2020 in IN Application No. 201927007747.
Chinese Office Action dated May 31, 2021 in CN Application No. 201780055839.7.
European Office Action, dated Sep. 29, 2021 (5 pages).
Chinese Office Action dated Dec. 3, 2021 in connection with Chinese application No. 201780055839.7 (pp. 7).

* cited by examiner

EXHAUST GAS PURIFICATION CATALYST AND METHOD FOR MANUFACTURING EXHAUST GAS PURIFICATION CATALYST

CROSS REFERENCE TO RELATED APPLICATIONS

This application is a National Stage of International Application No. PCT/JP2017/032665 filed on Sep. 11, 2017, which claims priority to Japanese Application No. 2016-177468 filed on Sep. 12, 2016, the contents of which are hereby incorporated by reference in their entirety.

TECHNICAL FIELD

The present invention relates to an exhaust gas purification catalyst, and particularly to an exhaust gas purification catalyst suitable for use in a selective catalytic reduction (SCR) type exhaust gas purification device, and to a method for manufacturing the exhaust gas purification catalyst.

The priority claim for this international application is based on Japanese Patent Application No. 2016-177468 submitted on Sep. 12, 2016, and the entire contents of that application are herein incorporated by reference.

BACKGROUND ART

The exhaust gas discharged from internal combustion engines such as automobile engines contains harmful components such as hydrocarbons (HC), carbon dioxide (CO) and nitrogen oxides (NOx). Exhaust gas purification devices are used to purify these harmful components. In particular, the exhaust gas discharged from diesel engines contains large quantities of NOx, and SCR type exhaust gas purification devices capable of selectively purifying such NOx are used.

In such an SCR type exhaust gas purification device, a reducing agent is mixed with the exhaust gas discharged from the internal combustion engine, and the exhaust gas is then brought into contact with an SCR catalyst to thereby selectively react the reducing agent with the NOx in the exhaust gas and break it down into nitrogen ($N_2$) and water ($H_2O$). Examples of such SCR type exhaust gas purification devices include for example urea-SCR type exhaust gas purification devices using urea as the reducing agent. Because such urea-SCR type exhaust gas purification devices purify NOx at a high rate, they are mainly used as exhaust gas purification devices for diesel engines.

However, because such urea-SCR type exhaust gas purification devices require a tank for storing urea to be mounted on the vehicle, they pose problems in terms of device cost and installation space. Consequently, HC-SCR (hydrocarbon-based selective catalytic reduction) type exhaust gas purification devices are being studied as compact, low-cost SCR type exhaust gas purification devices (see for example Patent Literature 1).

In such an HC-SCR type exhaust gas purification device, the exhaust gas is mixed with atomized fuel, after which this fuel is partially oxidized with an SCR catalyst to produce partially oxidized fuel. The HC-SCR type exhaust gas purification device then uses the partially oxidized fuel as a reducing agent to purify the NOx in the exhaust gas. Unlike a urea-SCR type device, an HC-SCR type exhaust gas purification device does not require a separate tank for the reducing agent, and therefore has the advantage of compactness and lower device costs.

CITATION LIST

Patent Literature

Patent Literature 1: Japanese Patent Application Publication No. 2016-133109

SUMMARY OF INVENTION

Technical Problem

However, one problem with the HC-SCR type exhaust gas purification catalyst described above is that NOx purification performance declines when the SCR catalyst is in a high-temperature environment (especially 450° C. or above). Specifically, when the SCR catalyst is in a high-temperature environment, the fuel oxidation ability of the catalyst is greater and more of the fuel is completely oxidized, so that less partially oxidized fuel is produced and NOx purification performance declines.

In recent years, considering this decline in NOx purification performance in high-temperature environments, the use of catalysts with low oxidizing ability has also been studied. However, the problem in this case is that NOx purification performance is lower at lower temperatures.

In light of these circumstances, it is a principal object of the present invention to provide an exhaust gas purification catalyst capable of efficiently producing partially oxidized fuel in high-temperature environments and preventing a drop in NOx purification ability with an HC-SCR type exhaust gas purification catalyst.

Solution to Problem

To achieve this object, an exhaust gas purification catalyst of the following configuration is provided by the present invention.

The exhaust gas purification catalyst disclosed here is an exhaust gas purification catalyst disposed in the exhaust pipe of an internal combustion engine to purify nitrogen oxides contained in exhaust gas discharged from the internal combustion engine, and comprises a silver alumina catalyst containing at least alumina as a catalyst and silver supported on this alumina.

Moreover, in the silver alumina catalyst of the exhaust gas purification catalyst disclosed here the ratio of the peak intensity at a wave number of 1595 $cm^{-1}$ to the peak intensity at a wave number of 1613 $cm^{-1}$ according to the pyridine IR method is at least 0.3, and the carried amount of silver is 1.0 wt % to 6.0 wt % given 100 wt % as the total amount of the silver alumina catalyst.

Strong Lewis acid points (hereunder sometimes called strong Lewis acid sites) are present on the surface of the alumina used as the carrier of the silver alumina catalyst. If silver is carried on or near these strong Lewis acid sites, weak Lewis acid points (hereunder sometimes called weak Lewis acid sites) are produced in the locations where the silver is carried.

The inventors conducted various experiments and research aimed at solving the problems described above. As a result, the inventors discovered that partially oxidized fuel could be efficiently produced using a silver alumina catalyst with many such weak Lewis acid sites because the oxidation reaction of the fuel is thereby slowed down even in high-temperature environments.

The inventors then repeatedly studied markers indicating how many such weak Lewis acid sites are present in the silver alumina catalyst. As a result, the inventors discovered that in a spectrum measured by the pyridine IR method, the ratio (hereunder sometimes called the "1595/1613 $cm^{-1}$ peak intensity ratio") of the peak intensity at a wave number of 1595 $cm^{-1}$, which represents weak Lewis acid sites, to the peak intensity at a wave number of 1613 $cm^{-1}$, which represents an acid point of a Lewis acid intermediate between weak and strong Lewis acids (hereunder sometimes called "intermediate Lewis acid sites" for convenience) could be used. The inventors then confirmed experimentally that a 1595/1613 $cm^{-1}$ peak intensity ratio of at least 0.3 was suitable for preventing a drop in NOx purification performance in high-temperature environments.

The inventors also considered it necessary to determine the appropriate ratio for the carried amount of silver in a silver alumina catalyst with weak Lewis acid sites. That is, to increase the NOx purification performance in a silver alumina catalyst with weak Lewis acid sites, the inventors considered it necessary to determine an appropriate carried amount of silver considering the effect on the 1595/1613 $cm^{-1}$ peak intensity ratio, rather than simply increasing the carried amount of silver as in an ordinary exhaust gas purification catalyst.

After repeated experiments into the appropriate carried amount of silver, it was discovered that the carried amount of silver could be set at 1.0 wt % to 6.0 wt % given 100 wt % as the total amount of the silver alumina catalyst. This results in efficient production of partially oxidized fuel even in high-temperature environments and high NOx purification performance.

Based on these findings, in the exhaust gas purification catalyst disclosed here the 1595/1613 $cm^{-1}$ peak intensity ratio and the carried amount of silver relative to the total amount of the silver alumina catalyst are set appropriately. Consequently, fuel mixed with exhaust gas can be slowly oxidized even in high-temperature environments, resulting in efficient production of partially oxidized fuel and improved NOx purification performance in comparison with conventional methods.

In a preferred embodiment of the exhaust gas purification catalyst disclosed here, the ratio of the peak intensity at a wave number of 1595 $cm^{-1}$ to the peak intensity at a wave number of 1613 $cm^{-1}$ according to the pyridine IR method is 0.4 to 1.0.

NOx purification performance in high-temperature environments can be improved by using a silver alumina catalyst with a 1595/1613 $cm^{-1}$ peak intensity ratio within this numerical range.

In another preferred embodiment of the exhaust gas purification catalyst disclosed here, the carried amount of silver is 2.0 wt % to 5.0 wt % given 100 wt % as the total amount of the silver alumina catalyst.

It is thus possible to efficiently produce partially oxidized fuel and further improve the NOx purification performance.

In another preferred embodiment of the exhaust gas purification catalyst disclosed here, the silver alumina catalyst contains one or two or more metal elements selected from Mg, Zn, Ti, W and AlF.

The details are explained below, but one method of increasing the weak Lewis acid sites is to add one or two or more metal elements selected from Mg, Zn, Ti, W and AlF in the step of preparing the silver alumina catalyst. A silver alumina catalyst obtained by such a method contains these various metal elements.

In another preferred embodiment of the exhaust gas purification catalyst disclosed here, the acid quantity of the silver alumina catalyst as measured by ammonia thermal desorption measurement ($NH_3$-TPD) is at least 0.3 mmol/g.

A silver alumina catalyst having such an acid quantity can efficiently product partially oxidized fuel because it has sufficient weak Lewis acid sites.

Another aspect of the invention provides a method for manufacturing an exhaust gas purification catalyst. This manufacturing method comprises a silver carrying step in which a silver alumina catalyst is produced by first preparing a mixture of a silver source, an alumina source and a water-based solvent, and then firing this mixture to prepare a silver alumina catalyst comprising silver carried on alumina, and a catalyst layer-forming step in which a catalyst layer comprising the silver alumina catalyst is formed on a substrate surface to prepare an exhaust gas purification catalyst, wherein an alumina source in which the ratio of the peak intensity at a wave number of 1621 $cm^{-1}$ to the peak intensity at a wave number of 1613 $cm^{-1}$ according to the pyridine IR method is at least 0.65 is used as the alumina source in the silver carrying step, and the mixed amounts of the silver source and alumina source are adjusted so that the carried amount of silver is 1.0 wt % to 6.0 wt % given 100 wt % as the total amount of the silver alumina catalyst.

As discussed above, the silver alumina catalyst of the exhaust gas purification catalyst disclosed here is prepared by causing silver to be carried on or near the strong Lewis acid sites of the alumina. In the exhaust gas purification catalyst manufacturing method disclosed here, a silver alumina catalyst with sufficient weak Lewis acid sites (that is a silver alumina catalyst with a 1595/1613 $cm^{-1}$ peak intensity ratio of at least 0.3) is prepared by using an alumina source with many strong Lewis acid sites (that is, with a 1621/1613 $cm^{-1}$ peak intensity ratio of at least 0.65 according to the pyridine IR method).

In the silver carrying step, moreover, the mixed amounts of the silver source and alumina source are adjusted so that the carried amount of the silver is 1.0 wt % to 6.0 wt % given 100 wt % as the total amount of the prepared silver alumina catalyst. The exhaust gas purification catalyst disclosed here can then be manufactured by supporting the silver alumina catalyst obtained in this silver carrying step on a substrate.

DESCRIPTION OF EMBODIMENTS

A preferred embodiment of the present invention is explained below based on the drawings. Matters not specifically mentioned in this Description that are necessary for implementing the invention (for example, general matters relating to the detailed structure of the exhaust gas purification device) can be understood as design matters by a person skilled in the art based on prior art in the field. The present invention can be implemented based on the content disclosed in this Description and on technical common knowledge in the field.

1. Exhaust Gas Purification Device

Figure 1:
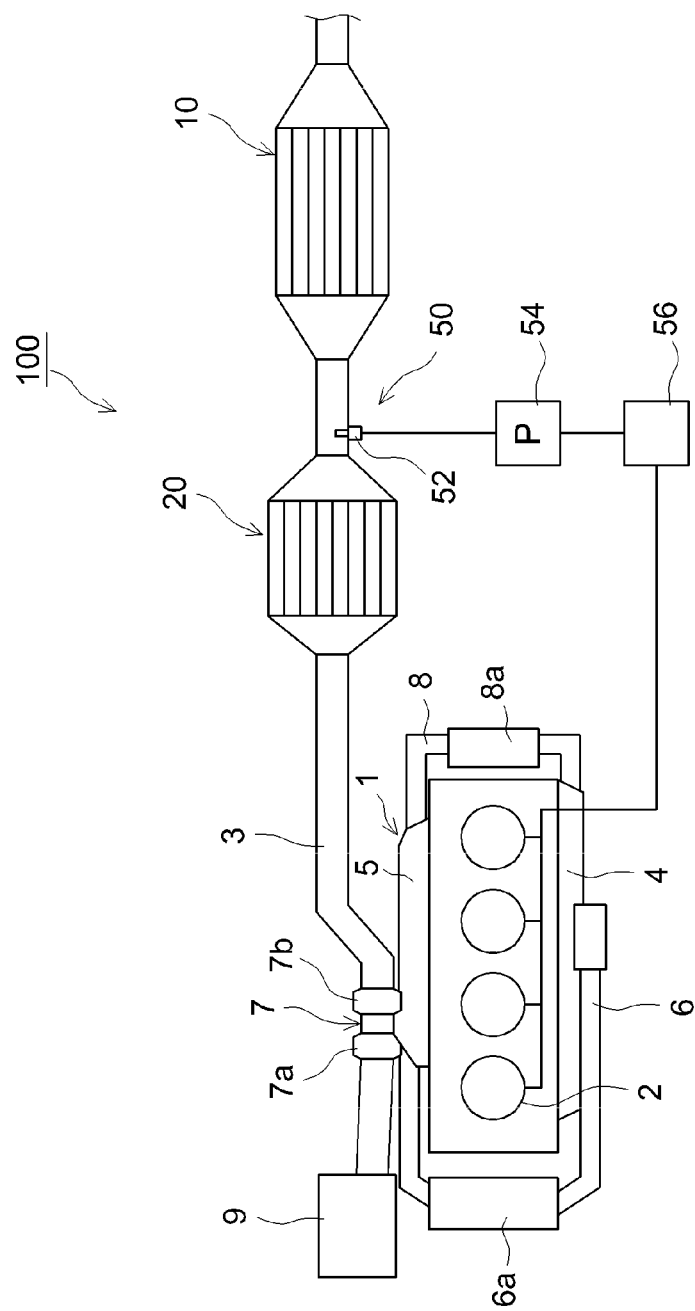
FIG. 1 schematically illustrates the overall configuration of an exhaust gas purification device of one embodiment of the present invention.

An exhaust gas purification device of this embodiment using the exhaust gas purification catalyst disclosed here will be explained first. FIG. 1 schematically illustrates the overall configuration of the exhaust gas purification device of this embodiment.

As shown in FIG. 1, the exhaust gas purification device 100 of this embodiment is an HC-SCR type exhaust gas purification device. In this exhaust gas purification device 100, a fuel is first supplied to and mixed with exhaust gas in the fuel supply part 50, after which this fuel is partially oxidized in the SCR catalyst 10. The exhaust gas purification device 100 then uses the partially oxidized fuel (partial oxides of the fuel) as a reducing agent to purify NOx in the exhaust gas.

Specifically, the exhaust gas purification device 100 of this embodiment is connected to exhaust pipe 3 of internal combustion engine 1, and the exhaust gas produced by the internal combustion engine 1 is purified by being passed through oxidization catalyst (diesel oxygen catalyst: DOC) 20, fuel supply part 50, and SCR catalyst 10 in that order. The individual parts in FIG. 1 are explained below.

(1) Internal Combustion Engine

In this embodiment, a diesel engine is used as the internal combustion engine 1. The diesel engine explained below is only one example of the internal combustion engine, and the exhaust gas purification catalyst disclosed here may be applied to internal combustion engines other than diesel engines (for example, gasoline engines and the like).

Internal combustion engine 1 is equipped with multiple combustion chambers 2, each of which is connected to the fuel tank 56, and fuel supplied from the fuel tank 56 is burned in the combustion chambers 2. Each combustion chamber 2 also communicates with intake manifold 4 and exhaust manifold 5.

The intake manifold 4 is connected to compressor 7a of exhaust turbo charger 7 via intake duct 6. The entrance of the compressor 7a is connected to air cleaner 9. Thus, air from outside the internal combustion engine 1 is supplied to the combustion chambers 2 inside the internal combustion engine 1 via the air cleaner 9, compressor 7a and intake manifold 4. Moreover, a cooling unit (intercooler) 6a for cooling the air inside the intake duct 6 is disposed around the intake duct 6.

The exhaust manifold 5 is connected to exhaust turbine 7b of the exhaust turbocharger 7. This exhaust turbine 7b is also connected to the exhaust pipe 3 through which the exhaust gas passes. As a result, the exhaust gas produced by the internal combustion engine 1 is discharged to the exhaust pipe 3 via the exhaust manifold 5 and exhaust turbine 7b.

In the internal combustion engine 1 shown in FIG. 1, the exhaust manifold 5 and intake manifold 4 are connected via exhaust gas recirculation conduit (EGR conduit) 8. Thus, this system is configured so that part of the exhaust gas is reused by the internal combustion engine 1. EGR cooling unit 8a for cooling the exhaust gas inside the EGR conduit 8 is disposed around the EGR conduit 8.

(2) Oxidation Catalyst

The oxidation catalyst 20 is connected to the internal combustion engine 1 via the exhaust pipe 3. This oxidation catalyst 20 is a catalyst having an oxidation function with respect to a component or components (such as CO or HC) in the exhaust gas. The oxidation catalyst 20 is formed from a monolith catalyst supporting a precious metal catalyst such as platinum (Pt) or rhodium (Rh). However, the type and specific configuration of the oxidation catalyst 20 are not particularly limited, and detailed explanations are omitted because these are not a special feature of the invention.

(3) Fuel Supply Part

As shown in FIG. 1, the fuel supply part 50 is disposed upstream from the SCR catalyst 10 in the exhaust pipe 3 for the exhaust gas. This fuel supply part 50 supplies the atomized fuel to the exhaust gas and mixes the fuel with the exhaust gas upstream from the SCR catalyst 10. Specifically, the fuel supply part 50 is connected to the fuel tank 56, and is equipped with spray nozzle 52 and pump 54. This fuel supply part 50 supplies the fuel in the fuel tank 56 to the spray nozzle 52 with pump 54, and supplies atomized fuel from the spray nozzle 52 to the inside of the exhaust pipe 3 to thereby mix the fuel with the exhaust gas inside the exhaust pipe 3.

(4) SCR Catalyst

The exhaust gas purification catalyst disclosed here is used as the SCR catalyst 10 in FIG. 1. As discussed above, the SCR catalyst 10 partially oxidizes the fuel mixed with exhaust gas, and the resulting partially oxidized fuel is used as a reducing agent to purify the NOx in the exhaust gas.

Figure 2:
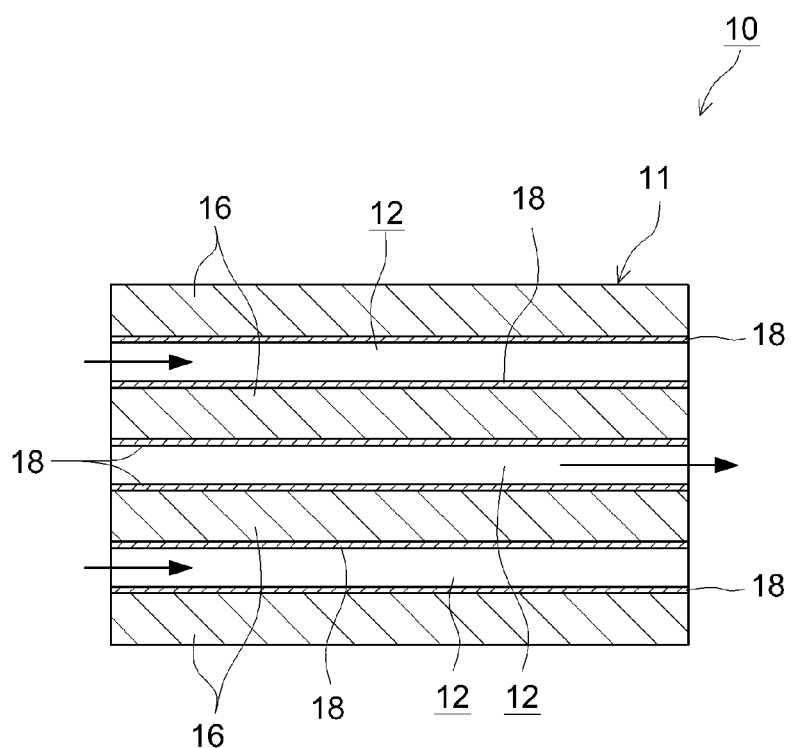
FIG. 2 is an enlarged view of a part of a cross-section of the SCR catalyst of the exhaust gas purification device of one embodiment of the invention cut along the axial direction.

FIG. 2 is an enlarged view of a part of a cross-section of the SCR catalyst 10 of the exhaust gas purification device 100 of this embodiment cut along the axial direction. As shown in FIG. 2, this SCR catalyst 10 is provided with substrate 11 and catalyst layer 18 supported on this substrate 11.

(a) Substrate

The substrate 11 is a straight flow type substrate having a honeycomb structure. The catalyst layer 18 (discussed below) is formed on the dividing walls 16 of this substrate 11. Specifically, the substrate 11 has multiple channels 12 separated by the dividing walls 16. An exhaust gas introduced into the SCR catalyst 10 passes through the channels 12 of the substrate 11 and is discharged downstream from the SCR catalyst 10. A honeycomb body made of a ceramic such as cordierite or a heat-resistant alloy or the like may be used for the substrate 11 for example.

The structure of the substrate is not limited to the aforementioned straight flow substrate having a honeycomb structure. For example, it is also possible to use a wall flow type substrate provided with porous dividing walls in which the exhaust gas is purified by passing it through the dividing walls. When using such a wall flow type substrate, the catalyst layer described below is formed within the porous dividing walls.

(b) Catalyst Layer

The catalyst layer 18 of the SCR catalyst 10 is formed by supporting a silver alumina catalyst on the surfaces of the dividing walls 16 of the substrate 11. This catalyst layer 18 partially oxidizes fuel that has been mixed with the exhaust gas in the fuel supply part 50 (see FIG. 1), and the resulting partially oxidized fuel is then used as a reducing agent to purify the NOx in the exhaust gas.

Specifically, the exhaust gas introduced into the SCR catalyst 10 comes into contact with the catalyst layer 18 formed on the surfaces of the dividing walls 16 as it passes through the channels 12 of the substrate 11. At this time, partially oxidized fuel is produced when the fuel contained in the exhaust gas contacts the silver alumina catalyst in the catalyst layer 18. The resulting partially oxidized fuel then acts as a reducing agent to purify the NOx in the exhaust gas.

2. Exhaust Gas Purification Catalyst

As discussed above, the exhaust gas purification catalyst disclosed here is used as the SCR catalyst 10 of the exhaust gas purification device 100 above.

Moreover, because the exhaust gas purification catalyst disclosed here is provided with a silver alumina catalyst having many weak Lewis acid sites, it can slowly oxidize the fuel in the exhaust gas even in high-temperature environments of 450° C. or above. As a result, partially oxidized fuel is efficiently produced, and a drop in NOx purification performance can be prevented. The silver alumina catalyst contained in the exhaust gas purification catalyst disclosed here is explained in detail below.

The exhaust gas purification catalyst disclosed here may also comprise other materials other than the silver alumina catalyst explained below as long as these do not detract from the effect of efficiently producing partially oxidized fuel.

As discussed above, the exhaust gas purification catalyst disclosed here uses a silver alumina catalyst with many weak Lewis acid sites.

The kinds of acid points in solid acid catalysts are classified generally into Bronsted acid sites and Lewis acid sites. According to the Bronsted-Lowry definition of acids and bases, a Bronsted acid is an acid that donate protons ($H^+$), while a Lewis acid is an acid that mediates an acid reaction by accepting an electron pair without an exchange of $H^+$.

The Lewis acid sites on the surface of the alumina serving as the carrier of the silver alumina catalyst include many strong Lewis acid sites. When silver is supported on or near these strong Lewis acid sites when preparing the silver alumina catalyst, the plus charge of the alumina migrates to the silver, producing weak Lewis acid sites in the locations where the silver is supported.

Using such a silver alumina catalyst with many weak Lewis acid sites, complete oxidation of the fuel is suppressed and partially oxidized fuel is efficiently produced because the fuel oxidation reaction is slowed down even in high-temperature environments.

Figure 3:
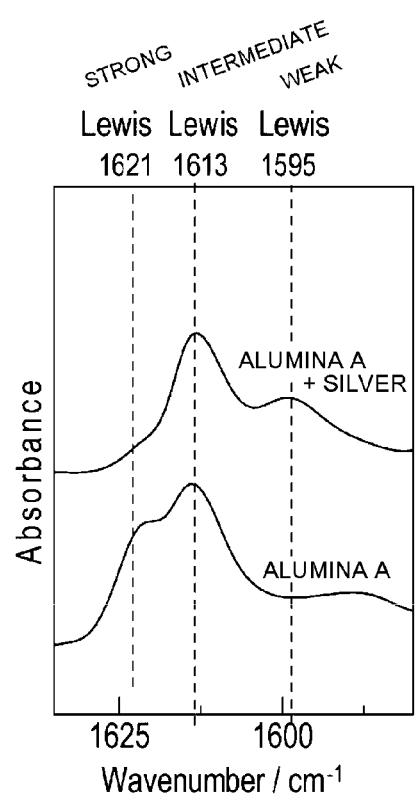
FIG. 3 shows pyridine IR analysis results for alumina and a silver alumina catalyst, with wave number shown on the horizontal axis and absorbance on the vertical axis.

The extent to which weak Lewis acid sites are present in the silver alumina catalyst can be specified based on the results of analysis according to the pyridine IR method. FIG. 3 shows pyridine IR analysis results for alumina and a silver alumina catalyst.

The pyridine IR method is a type of infrared spectroscopy (IR), and means infrared spectroscopy performed with pyridine adsorbed on the catalyst surface. When the alumina carrier and the silver alumina catalyst are subjected to pyridine IR, peaks are produced corresponding to 3 kinds of Lewis acid sites: strong Lewis acid sites, weak Lewis acid sites and Lewis acid points midway between strong and weak Lewis acids (intermediate Lewis acid sites) as shown in FIG. 3. Specifically, the peak of the strong Lewis acid sites appears at 1621 $cm^{-1}$, the peak of the weak Lewis acid sites appears at 1595 $cm^{-1}$, and the peak of the intermediate Lewis acid sites appears at 1613 $cm^{-1}$. The intensity of each peak corresponds to the numbers of each kind of Lewis acid site. Consequently, the extent to which strong Lewis acid sites and weak Lewis acid sites are present can be specified by determining the ratios of each relative to the peak intensity of the intermediate Lewis acid sites.

"Peak intensity by pyridine IR" in this Description is analyzed using a silver alumina catalyst pellet (diameter 10 mm, thickness 0.1 mm) obtained by compacting 10 mg of a powder of the silver alumina catalyst (average particle diameter (D50): 2 μm to 5 μm) under 30 kN of pressure.

To adsorb pyridine onto this silver alumina catalyst pellet, the pellet to be analyzed is first place in an environment with a flow of inactive gas (helium or the like), and subjected to a specific heat treatment (for example, at a heating temperature of 450° C. to 550° C. for a heating time of 10 to 30 minutes). Once the temperature has fallen to a specific temperature (for example, 150° C. to 250° C.), pyridine is introduced into the inactive gas and maintained for a specific amount of time. The "peak intensity by pyridine IR" in this Description is a value obtained when pyridine is adsorbed onto a silver alumina catalyst with the introduced amount of pyridine set to 1 μl and the holding time after introduction set to 10 minutes.

As shown in FIG. 3, a peak at a wave number of 1621 $cm^{-1}$ corresponding to strong Lewis acid sites and a peak at a wave number of 1613 $cm^{-1}$ corresponding to intermediate Lewis acid sites can be confirmed in the alumina without the supported silver ("alumina A" in FIG. 3). In the silver alumina catalyst with the supported silver ("alumina A+" in FIG. 3), on the other hand, the peak at a wave number of 1621 $cm^{-1}$ corresponding to strong Lewis acid sites has been eliminated, and a peak at a wave number of 1595 $cm^{-1}$ corresponding to weak Lewis acid sites appears. This is because weak Lewis acid sites have been produced in the locations where silver has been supported on or near the strong Lewis acid sites of the alumina.

Moreover, as discussed above, the 1595/1613 $cm^{-1}$ peak intensity ratio can indicate how many weak Lewis acid sites are present in the silver alumina catalyst.

Then, the present inventors have found, as a result of various experiments, that partially oxidized fuel is efficiently produced when the 1595/1613 $cm^{-1}$ peak intensity ratio is at least 0.3. The 1595/1613 $cm^{-1}$ peak intensity ratio is preferably 0.3 to 1.0, or more preferably 0.4 to 0.8, or still more preferably 0.4 to 0.65. Partially oxidized fuel can thus be efficiently produced.

To further improve the NOx purification rate of the silver alumina catalyst disclosed here, it is necessary to adjust the carried amount of silver so as to obtain a suitable ratio of weak Lewis acid sites, rather than simply increasing the carried amount of silver as in an ordinary exhaust gas purification catalyst. Specifically, in the silver alumina catalyst disclosed here the carried amount of silver is set at 1.0 wt % to 6.0 wt % given 100 wt % as the total amount of the silver alumina catalyst. To further improve the NOx purification performance, the carried amount of the silver is preferably set at 2.0 wt % to 5.0 wt %.

As discussed above, in the exhaust gas purification catalyst disclosed here the 1595/1613 $cm^{-1}$ peak intensity ratio and the carried amount of silver relative to the silver alumina catalyst as a whole are set appropriately. Consequently, a fuel mixed with an exhaust gas can be oxidized slowly even in high-temperature environments. Partially oxidized fuel can be efficiently produced as a result, and NOx purification performance can be improved over prior art by using this partially oxidized fuel as a reducing agent.

The exhaust gas purification catalyst disclosed here preferably comprises a silver alumina catalyst with an acid quantity of at least 0.3 mmol/g or preferably 0.3 mmol/g to 0.5 mmol/g as measured by ammonia temperature-programmed desorption ($NH_3$-TPD). A silver alumina catalyst having such an acid quantity can efficiently produce partially oxidized fuel because it has a sufficient number of weak Lewis acid sites.

3. Method for Manufacturing Exhaust Gas Purification Catalyst

A method for manufacturing an SCR catalyst 10 such as that shown in FIG. 2 is explained next as one example of a method for manufacturing the exhaust gas purification catalyst disclosed here. The SCR catalyst 10 shown in FIG. 2 is manufactured via a silver carrying step and a catalyst layer-forming step. Each of these steps is explained below.

(1) Silver Carrying Step

A liquid mixture is first prepared by mixing a silver source, which is a compound containing silver, with an alumina source, which is a compound containing aluminum, and an aqueous solvent such as water. This mixture is then fired to prepare a powder of a silver alumina catalyst comprising silver carried on alumina.

(a) Preparation of Liquid Mixture Various compounds containing silver element can be used as the silver source used in preparing the liquid mixture. Examples of such silver sources include silver nitrate ($AgNO_3$), silver oxide ($Ag_2O$), silver carbonate ($Ag_2CO_3$), silver oxalate ($C_2AgO_4$) and the like.

Various aluminum compounds containing aluminum element may be used as the alumina source. Specifically, an alumina such as θ-alumina, δ-alumina or γ-alumina may be used as is as the alumina source, or an aluminum compound such as gibbsite, bayerite, boehmite or aluminum hydroxide from which alumina can be formed may be used in the step described below. Of these aluminum compounds, boehmite is most desirable for easily obtaining an alumina carrier with many strong Lewis acid sites.

Furthermore, in this embodiment a liquid mixture is prepared by measuring the silver source and the aluminum source so that the carried amount of silver is 1.0 wt % to 6.0 wt % given 100 wt % as the amount of the silver alumina catalyst, and mixing these with an aqueous medium.

As discussed above, the silver alumina catalyst of the exhaust gas purification catalyst prepared here is prepared by supporting silver on or near the strong Lewis acid sites of alumina. Consequently, in this embodiment an alumina compound with many strong Lewis acid sites or in other words with a 1621/1613 $cm^{-1}$ peak intensity ratio of at least 0.65 according to the pyridine IR method is used as the alumina source. Using such an alumina compound, it is possible to obtain a silver alumina catalyst with sufficient weak Lewis acid sites (that is, a silver alumina catalyst with a 1595/1613 $cm^{-1}$ peak intensity ratio of at least 0.3).

The 1621/1613 $cm^{-1}$ peak intensity ratio of the aluminum compound used as an alumina source is preferably 0.65 to 1.00, or more preferably 0.7 to 0.8. Using an alumina compound with a 1621/1613 $cm^{-1}$ peak intensity ratio within this range, it is possible to appropriately prepare a silver alumina catalyst with sufficient weak Lewis acid sites.

In addition to the silver source and alumina source discussed above, various other co-catalyst components may also be added to the liquid mixture. When adding a co-catalyst component, the added amount thereof is preferably studied thoroughly in advance depending on the type of added co-catalyst component. That is, if too much of a co-catalyst component is added it becomes more difficult to produce partially oxidized fuel because the ability to oxidize the fuel is too great. On the other hand, the exhaust gas purification ability can be improved by adding a suitable amount of a co-catalyst. Ion-exchange zeolite, ceria-stabilized zirconia (CZ), $SiO_2$, $Al_2O_3$ or the like can be used as the co-catalyst component.

(b) Firing

The prepared liquid mixture is then fired to prepare a powder of a silver alumina catalyst comprising silver supported on alumina. An alumina source having many strong Lewis acid sites and a 1621/1613 $cm^{-1}$ peak intensity ratio of at least 0.65 is used in this embodiment. Consequently, the firing step causes silver to be carried on the strong Lewis acid sites of the alumina, yielding a silver alumina catalyst with many weak Lewis acid sites (that is, a silver alumina catalyst with a 1595/1613 $cm^{-1}$ peak intensity ratio of at least 0.3).

The firing conditions here are preferably adjusted appropriately so as to yield a silver alumina catalyst with a 1595/1613 $cm^{-1}$ peak intensity ratio of at least 0.3. Specifically, the firing conditions differ according to the ratio of strong Lewis acid sites in the alumina source, or in other words the 1621/1613 $cm^{-1}$ peak intensity ratio of the alumina source. For example, using boehmite as the alumina source, the firing temperature is preferably 450° C. to 750° C. (such as 500° C.) and the firing time is preferably 1 to 8 hours (such as 1 hour) in order to produce γ-alumina as a carrier having many strong Lewis acid sites and support silver on the strong Lewis acid sites of this γ-alumina.

(2) Catalyst Layer-Forming Step

In the catalyst layer-forming step of this embodiment, an exhaust gas purification catalyst is manufactured by forming, on the surface of a substrate, a catalyst layer containing the silver alumina catalyst obtained in the silver carrying step above. Slurry preparation, slurry application, drying, and firing are performed in that order in the catalyst layer-forming step.

(a) Slurry Preparation

In the catalyst layer-forming step, first the silver alumina catalyst obtained in the silver carrying step above is dispersed in a dispersion medium to prepare a slurry containing the silver alumina catalyst. It is also desirable to add a binder to the slurry so that the slurry can be made to adhere adequately to the dividing walls of the substrate. Examples of this binder include alumina sol, silica sol and the like. The particle size of the silver alumina catalyst may also be adjusted for dispersing in the slurry.

(b) Slurry Application

Next, the slurry prepared in the above step is applied to the dividing walls 16 of a straight flow type substrate 11 having a honeycomb structure as shown in FIG. 2. A known wash coat method or the like may be used for applying the slurry.

(c) Drying

Next, the liquid mixture is dried to thereby cause the mixture containing the silver alumina catalyst to adhere to the dividing walls 16 of the substrate 11. The mixture can be dried under the same conditions used to dry mixtures in ordinary SCR catalyst preparation. Specifically, the mixture can be heated for 30 minutes to 2 hours (such as 1 hour) at a temperature of 200° C. to 300° C. (such as 250° C.).

(d) Firing

Next, the mixture adhering to the dividing walls 16 of the substrate 11 is fired. This serves to bake the mixture and form a catalyst layer 18 containing the silver alumina catalyst on the surface of the substrate 11. An exhaust gas purification catalyst (SCR catalyst 10) comprising a silver alumina catalyst with a 1595/1613 $cm^{-1}$ peak intensity ratio of at least 0.3 carrying 1.0 wt % to 6.0 wt % of silver is obtained in this way.

As discussed above, such an SCR catalyst having a silver alumina catalyst can efficiently produce partially oxidized fuel even in a high-temperature environment. NOx in exhaust gas can then be efficiently purified by using this partially oxidized fuel as a reducing agent.

In the embodiment discussed above, a silver alumina catalyst with a 1595/1613 $cm^{-1}$ peak intensity ratio of at least 0.3 is prepared by first providing an alumina compound with a 1621/1613 $cm^{-1}$ peak intensity ratio of at least 0.65. However, the method of preparing a silver alumina catalyst with a 1595/1613 $cm^{-1}$ peak intensity ratio of at least 0.3 is not limited to this method.

For example, it is also possible to include a Lewis acid increase step in which the strong Lewis acid sites of the alumina source are increased when preparing the liquid mixture of the silver source and alumina source.

As one example of this Lewis acid increase step, additives including one or two or more metal elements selected from Mg and Zn can be added to the mixture. For example, when Mg (or Zn) is added to the mixture the Mg (or Zn) is incorporated into the crystals of alumina ($Al_2O_3$), thereby imparting a spinel structure to the alumina crystal structure and increasing the strong Lewis acid sites on the alumina surface. The strong Lewis acid sites of the alumina source can also be increased by adding a compound such as $TiO_2$, $W_2O_3$ or AlF having Lewis acid sites to the liquid mixture.

Of the metal elements discussed above, Zn is desirable because it increases the strong Lewis acid sites in the alumina most appropriately. These metal elements may also be added to the liquid mixture in the form of compounds. For example, when adding Zn, zinc nitrate ($Zn(NO_3)_2$), zinc chloride ($ZnCl_2$), zinc gluconate ($C_{12}H_{22}O_{14}Zn$), zinc sulfate ($ZnSO_4$) or the like may be used. Of these compounds, zinc nitrate is especially desirable for efficiently increasing the strong Lewis acid sites of the alumina.

Another example of a method for increasing the weak Lewis acid sites in the silver alumina catalyst is hydrothermal treatment. This hydrothermal treatment increases the strong Lewis acid sites on the surface of the alumina carrier by modifying the surface of the alumina, so that a silver alumina catalyst with many weak Lewis acid sites can then be easily prepared.

The temperature for this hydrothermal treatment is preferably 100° C. to 450° C., and the treatment time is preferably 1 to 50 hours. By setting the conditions for this hydrothermal treatment, it is possible to more efficiently increase the strong Lewis acid sites of the alumina, and more easily prepare a silver alumina catalyst with a 1595/1613 $cm^{-1}$ peak intensity ratio of at least 0.3.

Each of these treatments for increasing the Lewis acid sites can be implemented even when using an aluminum compound with a 1621/1613 $cm^{-1}$ peak intensity ratio of at least 0.65. It is thus possible to more reliably prepare a silver alumina catalyst with a 1595/1613 $cm^{-1}$ peak intensity ratio of at least 0.3.

TEST EXAMPLES

Test examples of the present invention are explained below, but not with the intent of limiting the present invention to what is shown in the test examples.

In these test examples, exhaust gas purification catalysts (Test Examples 1 to 9) were prepared comprising 9 kinds of silver alumina catalysts prepared by different preparation steps. The 1595/1613 $cm^{-1}$ peak intensity ratios of the metal alumina catalysts in the prepared exhaust gas purification catalysts were then measured, and NOx purification performance was investigated. The test examples are explained in detail below.

1. Preparation of Test Examples (1) Test Example 1

In Test Example 1, a liquid mixture was prepared by mixing 6.34 g of silver nitrate with 121.03 g of boehmite so that silver would constitute 4 wt % of the prepared silver alumina catalyst, with the remainder being alumina given 100 wt % as the amount of the silver alumina catalyst after preparation. This liquid mixture was then fired to obtain a silver alumina catalyst in powder form. In Test Example 1, a boehmite having a 1621/1613 $cm^{-1}$ peak intensity ratio of 0.77 (boehmite A) was used as an alumina source.

A slurry was then prepared containing the prepared silver alumina catalyst, and this slurry was applied to the dividing walls of a porous straight through substrate (capacity 1 L) with a monolith honeycomb structure, and heated for 1 hour at 250° C. to dry the slurry, after which this was fired for 1 hour at 600° C. to prepare an exhaust gas purification catalyst comprising a silver alumina catalyst.

(2) Test Example 2

In Test Example 2, an exhaust gas purification catalyst was prepared under the same conditions as in Test Example 1 except that a boehmite with a 1621/1613 cm peak intensity ratio of 0.65 (boehmite B) was used.

(3) Test Example 3

In Test Example 3, a silver alumina catalyst was prepared under the same conditions as in Test Example 1 except that a boehmite with a 1621/1613 $cm^{-1}$ peak intensity ratio of 0.67 (boehmite C) was used.

(4) Test Example 4

In Test Example 4, a silver alumina catalyst was prepared under the same conditions as in Test Example 1 using the boehmite A (1621/1613 $cm^{-1}$ peak intensity ratio 0.77) of Test Example 1 as the alumina source, but with 18.32 g of zinc nitrate added as a Zn source. In this test example, the 1621/1613 $cm^{-1}$ peak intensity ratio rose to 1.02 due to the addition of zinc nitrate.

(5) Test Example 5

In Test Example 5, a silver alumina catalyst was prepared under the same conditions as in Test Example 1 except that γ-alumina with a 1621/1613 $cm^{-1}$ peak intensity ratio of 0.60 (γ-alumina A) was used as the alumina source.

(6) Test Example 6

In Test Example 6, a silver alumina catalyst was prepared under the same conditions as in Test Example 1 except that the liquid mixture was prepared by mixing 1.59 g of silver nitrate and 132.34 g of boehmite so that the proportion of silver in the prepared silver alumina catalyst as a whole was 1.0 wt %.

(7) Test Example 7

In Test Example 7, a silver alumina catalyst was prepared under the same conditions as in Test Example 1 except that the liquid mixture was prepared by mixing 3.17 g of silver nitrate and 131.00 g of boehmite so that the proportion of silver in the prepared silver alumina catalyst as a whole was 2.0 wt %.

(8) Test Example 8

In Test Example 8, a silver alumina catalyst was prepared under the same conditions as in Test Example 1 except that the liquid mixture was prepared by mixing 7.93 g of silver nitrate and 126.96 g of boehmite so that the proportion of silver in the prepared silver alumina catalyst as a whole was 5.0 wt %.

(9) Test Example 9

In Test Example 9, a silver alumina catalyst was prepared under the same conditions as in Test Example 1 except that the liquid mixture was prepared by mixing 15.86 g of silver nitrate and 120.23 g of boehmite so that the proportion of silver in the prepared silver alumina catalyst as a whole was 10.0 wt %.

2. Evaluation Tests (1) 1595/1613 $cm^{-1}$ Peak Intensity Ratio

Pyridine was adsorbed on the silver alumina catalysts of each test example, and the peak intensities indicating Lewis acid sites were measured by infrared spectroscopy (IR). The 1595/1613 $cm^{-1}$ peak intensity ratio was then calculated based on the measurement results, and used as an indicator of the number of weak Lewis acid sites present.

Specifically, the silver alumina catalyst of each test example was first finely pulverized in an agate mortar so that the average particle diameter (D50) was in the range of 2 μm to 5 μm. 10 mg of this silver alumina catalyst powder was then compacted with a tableting machine (pressure: 30 kN) to mold a pellet of the silver alumina catalyst (diameter 10 mm, thickness 0.1 mm).

Next, the molded pellet was placed in an environment with a flow of He gas (flow rate 50 ml/min) and heat treated (500° C., 20 minutes), after which the temperature was lowered to 200° C.

1 μl of pyridine was then introduced into the He gas, and maintained for 10 minutes to adsorb the pyridine onto the surface of the silver alumina catalyst, after which FT-IR (Fourier Transform Infrared Spectroscopy) was performed to measuring the peak intensities representing Lewis acid sites. The 1595/1613 $cm^{-1}$ peak intensity ratio was then calculated based on the measurement results. The results are shown in Table 1.

In this test example, measurement of peak intensity by the FT-IR method was performed under the following conditions using an infrared spectrometer (JASCO Corporation model no. FT/IR-6600).

Measurement wave number range: 600 $cm^{-1}$ to 4000 $cm^{-1}$
Apodization: Cosine
Integrations: 32
Detector: MCT detector
Resolution: 4 $cm^{-1}$ (2) NOx Purification Rate In each test example, the NOx purification rate at 450° C. was determined to evaluate NOx purification performance in a high-temperature environment. Specifically, the exhaust gas purification catalyst of each test example was connected to an exhaust gas generator for testing, and vaporized HC was mixed at a concentration of 4,000 ppmC with lean equivalent model gas and passed through the exhaust gas purification catalyst in a high-temperature environment of 450° C. The NOx concentration of the model gas was measured after it had passed through the catalyst, and the NOx purification rate was calculated based on the measurement results. The results are shown in Table 1 and FIG. 7.

(3) Measurement of Acid Quantity Based on $NH_3$-TPD

Test Examples 1 to 3 and Test Example 5 were subjected to by ammonia thermal desorption measurement ($NH_3$-TPD) to measure the acid quantity of the silver alumina catalyst. The results are shown in Table 1.

In ammonia thermal desorption measurement, pre-treatment was first performed in a He gas atmosphere at 450° C., after which a gas containing $NH_3$ and He (temperature: 100° C.) was supplied to the silver alumina catalyst to adsorb the $NH_3$ onto the silver alumina catalyst. The temperature was then raised to 600° C. at a rate of 10° ° C. minute as $N_2$ gas was supplied to desorb the $NH_3$ adsorbed on the silver alumina catalyst, desorption was measured, and the acid quantity was calculated based on the $NH_3$ desorption.

TABLE 1

|  | Alumina source | Carried silver (wt %) | 1621/1613 $cm^{-1}$ peak intensity ratio of alumina carrier | 1595/1613 $cm^{-1}$ peak intensity ratio of silver alumina catalyst | NOx purification rate (%) | Acid quantity (mmol/g) |
|---|---|---|---|---|---|---|
| Test Ex. 1 | Boehmite A | 4.0 | 0.77 | 0.44 | 89.0 | 0.37 |
| Test Ex. 2 | Boehmite B | 4.0 | 0.65 | 0.42 | 80.0 | 0.34 |
| Test Ex. 3 | Boehmite C | 4.0 | 0.67 | 0.32 | 79.0 | 0.35 |
| Test Ex. 4 | Boehmite A (w/added zinc nitrate) | 4.0 | 0.77 (1.02 after zinc nitrate added) | 0.61 | 95.0 | — |
| Test Ex. 5 | γ-alumina A | 4.0 | 0.60 | 0.21 | 23.0 | 0.24 |
| Test Ex. 6 | Boehmite A | 1.0 | 0.77 | 0.30 | 55.5 | — |
| Test Ex. 7 | Boehmite A | 2.0 | 0.77 | 0.35 | 78.0 | — |
| Test Ex. 8 | Boehmite A | 5.0 | 0.77 | 0.35 | 78.5 | — |
| Test Ex. 9 | Boehmite A | 10.0 | 0.77 | 0.19 | 8.2 | — |

Figure 7:
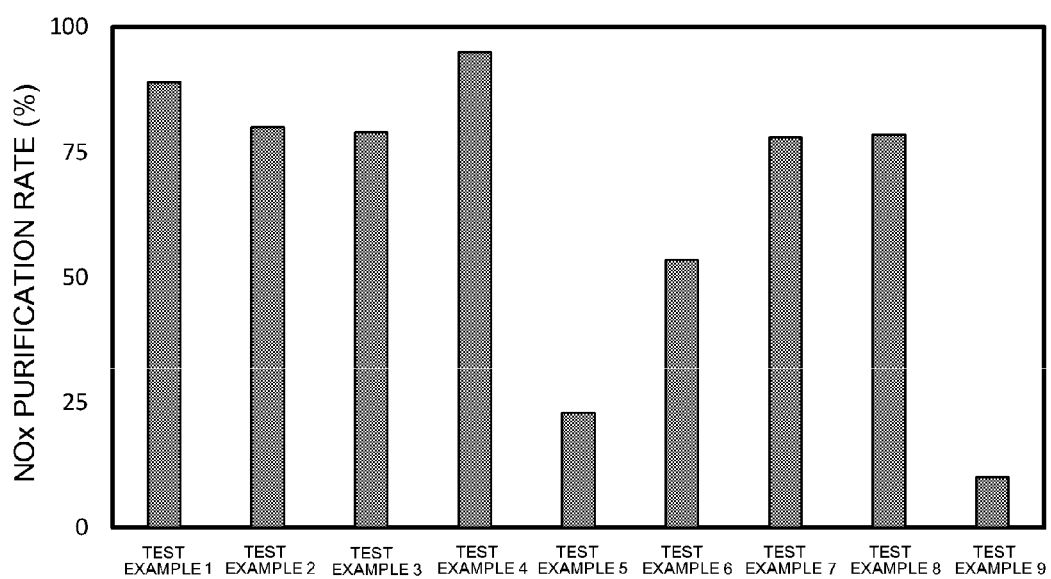
FIG. 7 is a graph showing the NOx purification rate in Test Examples 1 to 9, with the NOx purification rate (%) shown on the vertical axis.

First, comparing the NOx purification rates for Test Examples 1 to 9 as shown in FIG. 7, high NOx purification rates of at least 52% were obtained with Test Examples 1 to 4 and Test Examples 6 to 8 even in a high-temperature environment of 450° C.

Figure 4:
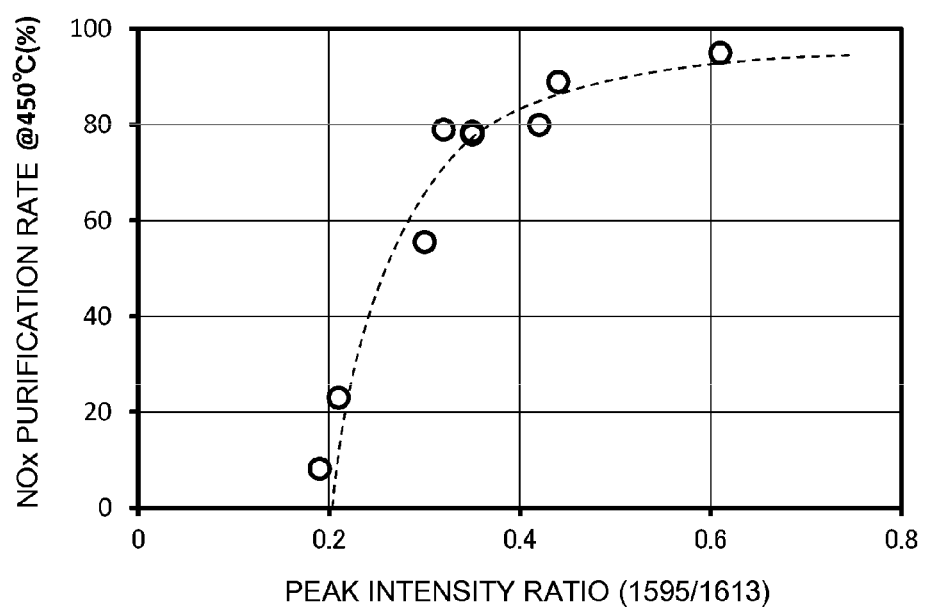
FIG. 4 is a graph showing the relationship between the 1595/1613 $cm^{-1}$ peak intensity ratio and the NOx purification rate at 450° C. in Test Examples 1 to 9, with the 1595/1613 $cm^{-1}$ peak intensity ratio shown on the horizontal axis and the NOx purification rate (%) on the vertical axis.

When the relationship between the 1595/1613 cm$^{-1}$ peak intensity ratio and NOx purification rate was investigated in each test example, as shown in FIG. 4, an approximate curve was obtained showing a rapid increase in the NOx purification rate only when the 1595/1613 cm$^{-1}$ peak intensity ratio was 0.3.

This confirms that partially oxidized fuel can be efficiently produced and a high NOx purification rate achieved even in a high-temperature environment by using a silver alumina catalyst with a 1595/1613 cm$^{-1}$ peak intensity ratio of at least 0.3.

Comparing Test Examples 1 to 5 in Table 1, moreover, the 1595/1613 cm$^{-1}$ peak intensity ratio of the silver alumina catalyst after the silver was carried tended to be higher the higher the 1621/1613 cm$^{-1}$ peak intensity ratio of the alumina source when the carried amount of silver was the same.

It was also confirmed that when the 1621/1613 cm$^{-1}$ peak intensity ratio of the alumina source was at least 0.65, a silver alumina catalyst with a 1595/1613 cm$^{-1}$ peak intensity ratio of at least 0.3 could be prepared.

Comparing Test Example 1 with Test Example 4. The 1595/1613 cm$^{1}$ peak intensity ratio of the silver alumina catalyst was higher and the NOx purification rate was greater in Test Example 4, in which zinc nitrate was added as a Zn source when carrying the silver. This confirms that the weak Lewis acid sites of the silver alumina catalyst can be increased and partially oxidized fuel can be efficiently produced by adding a metal element such as Zn when carrying the silver.

Figure 5:
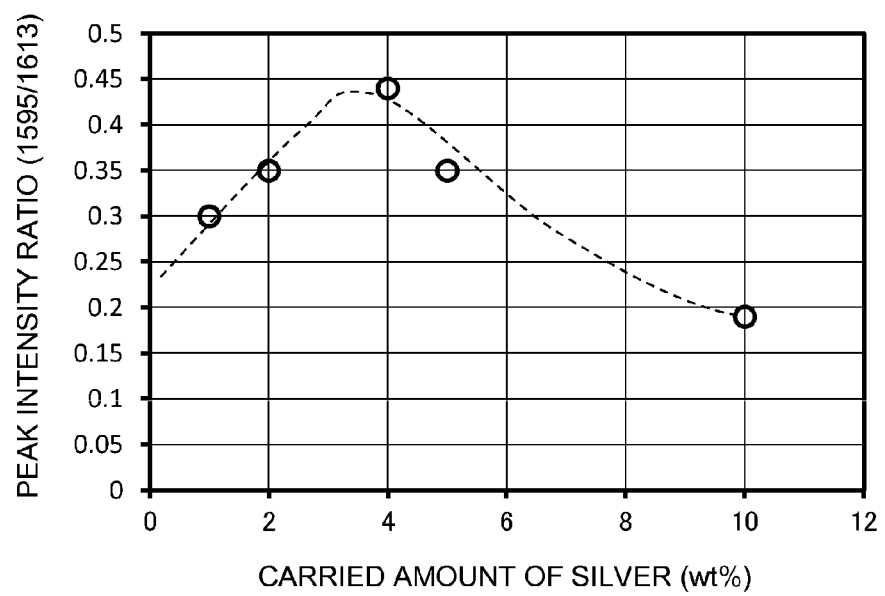
FIG. 5 is a graph showing the relationship between the 1595/1613 $cm^{-1}$ peak intensity ratio and the carried amount of silver in Test Examples 1 to 9, with the carried amount (wt %) shown on the horizontal axis and the 1595/1613 $cm^{-1}$ peak intensity ratio on the vertical axis.

As shown by FIG. 5 and the results for Test Example 1 and Test Examples 6 to 9 in Table 1, moreover, the 1595/1613 cm$^{-1}$ peak intensity ratio of the silver alumina catalyst varied depending on the carried amount of silver even when the 1621/1613 cm$^{-1}$ peak intensity ratio of the alumina source was unchanged.

Figure 6:
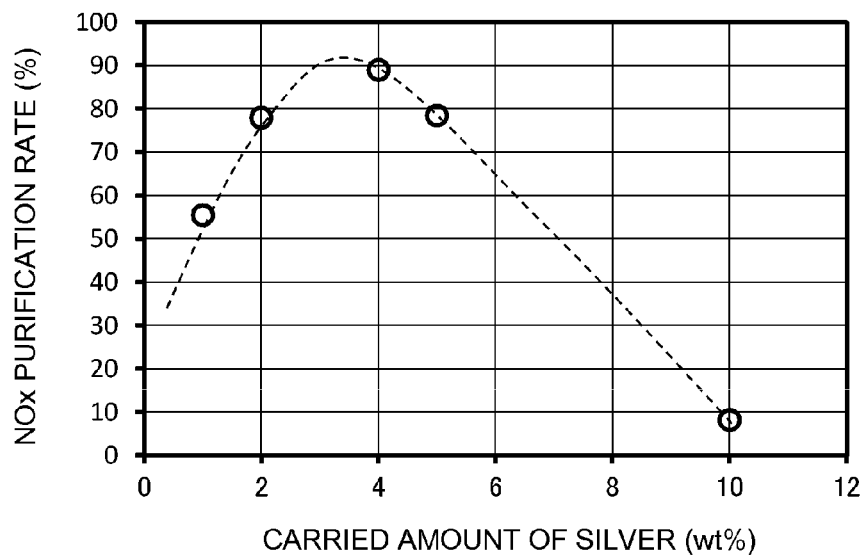
FIG. 6 is a graph showing the relationship between the carried amount of silver and NOx purification rate in Test Examples 1 and Test Examples 6 to 9, with the carried amount (wt %) shown on the horizontal axis and the NOx purification rate (%) on the vertical axis.

Furthermore, as shown in FIG. 6, in Test Example 1 and Test Examples 6 to 9 the NOx purification rate was highest when the carried amount of silver was about 3.0 wt %, and the NOx purification rate tended to be lower if the carried amount of silver was too large or too small. Based on the approximation curve of FIG. 6 prepared based on these results, a carried amount of silver in the range of 1.0 wt % to 6.0 wt % is required to obtain an NOx purification rate of at least 50% in a high-temperature environment of 450° C. It was also confirmed that a high NOx purification rate of at least 70% could be obtained with a range of 2.0 wt % to 5.0 wt %.

These Test Examples confirm that partially oxidized fuel can be efficiently produced and a high NOx purification rate obtained even in a high-temperature environment of 450° C. or above by using an exhaust gas purification catalyst comprising a silver alumina catalyst with a 1595/1613 cm$^{-1}$ peak intensity ratio of at least 0.3 and a carried amount of silver of 1.0 wt % to 6.0 wt %.

Specific examples of the present invention were explained in detail above, but these are only examples, and do not limit the Claims. The technology described in the Claims encompasses various modifications and changes to the specific examples given above.

INDUSTRIAL APPLICABILITY

The present invention can provide an exhaust gas purification catalyst whereby partially oxidized fuel can be efficiently produced and a drop in NOx purification performance prevented even in high-temperature environments with an HC-SCR type exhaust gas purification catalyst.

The invention claimed is:

1. An exhaust gas purification catalyst disposed in an exhaust pipe of an internal combustion engine to purify nitrogen oxides contained in exhaust gas discharged from the internal combustion engine and provided with a silver alumina catalyst comprising at least alumina as a carrier and silver carried on this alumina, wherein, in the silver alumina catalyst, the ratio of the peak intensity at a wave number of 1595 cm$^{-1}$ to the peak intensity at a wave number of 1613 cm$^{-1}$ according to the pyridine IR method is at least 0.3, and the carried amount of the silver is 1.0 wt. % to 6.0 wt. % given 100 wt. % as the total amount of the silver alumina catalyst.

2. The exhaust gas purification catalyst according to claim 1, wherein the ratio of the peak intensity of the silver alumina catalyst at a wave number of 1595 cm$^{-1}$ to the peak intensity at a wave number of 1613 cm$^{-1}$ according to the pyridine IR method is 0.4 to 1.0.

3. An exhaust gas purification catalyst according to claim 2, wherein the content of the silver is 2.0 wt. % to 5.0 wt. % given 100 wt. % as the total amount of the silver alumina catalyst.

4. An exhaust gas purification catalyst according to claim 2, wherein the silver alumina catalyst further contains one or more of Mg, Zn, Ti, W, and AlF.

5. An exhaust gas purification catalyst according to claim 2, wherein the acid quantity of the silver alumina catalyst as measured by ammonia thermal desorption measurement is at least 0.3 mmol/g.

6. An exhaust gas purification catalyst manufacturing method for manufacturing an exhaust gas purification catalyst according to claim 2, said method comprising
a silver carrying step in which a silver alumina catalyst is formed by preparing a mixture of a silver source, an alumina source, and a water-based solvent and firing this mixture to prepare a silver alumina catalyst comprising silver carried on alumina and
a catalyst layer-forming step in which a catalyst layer containing the silver alumina catalyst is formed on a substrate surface to prepare an exhaust gas purification catalyst,
wherein, in the silver carrying step, an alumina source in which the ratio of the peak intensity at a wave number of 1621 cm$^{-1}$ to the peak intensity at a wave number of 1613 cm$^{-1}$ according to the pyridine IR method is at least 0.65 is used as the alumina source, and the mixed amounts of the silver source and alumina source are adjusted so that the carried amount of the silver is 1.0 wt. % to 6.0 wt. % given 100 wt. % as the total amount of the silver alumina catalyst.

7. An exhaust gas purification catalyst according to claim 1, wherein the content of the silver is 2.0 wt. % to 5.0 wt. % given 100 wt. % as the total amount of the silver alumina catalyst.

8. An exhaust gas purification catalyst according to claim 7, wherein the silver alumina catalyst further contains one or more of Mg, Zn, Ti, W, and AlF.

9. An exhaust gas purification catalyst according to claim 7, wherein the acid quantity of the silver alumina catalyst as measured by ammonia thermal desorption measurement is at least 0.3 mmol/g.

10. An exhaust gas purification catalyst manufacturing method for manufacturing an exhaust gas purification catalyst according to claim 7, said method comprising a silver carrying step in which a silver alumina catalyst is formed by preparing a mixture of a silver source, an alumina source and a water-based solvent and firing this mixture to prepare a silver alumina catalyst comprising silver carried on alumina and a catalyst layer-forming step in which a catalyst layer containing the silver alumina catalyst is formed on a substrate surface to prepare an exhaust gas purification catalyst, wherein, in the silver carrying step, an alumina source in which the ratio of the peak intensity at a wave number of 1621 $cm^{-1}$ to the peak intensity at a wave number of 1613 $cm^{-1}$ according to the pyridine IR method is at least 0.65 is used as the alumina source, and the mixed amounts of the silver source and alumina source are adjusted so that the carried amount of the silver is 1.0 wt. % to 6.0 wt. % given 100 wt. % as the total amount of the silver alumina catalyst.

11. An exhaust gas purification catalyst according to claim 1, wherein the silver alumina catalyst further contains one or more of Mg, Zn, Ti, W, and AlF.

12. An exhaust gas purification catalyst according to claim 11, wherein the acid quantity of the silver alumina catalyst as measured by ammonia thermal desorption measurement is at least 0.3 mmol/g.

13. An exhaust gas purification catalyst manufacturing method for manufacturing an exhaust gas purification catalyst according to claim 11, said comprising a silver carrying step in which a silver alumina catalyst is formed by preparing a mixture of a silver source, an alumina source, and a water-based solvent, and firing this mixture to prepare a silver alumina catalyst comprising silver carried on alumina and a catalyst layer-forming step in which a catalyst layer containing the silver alumina catalyst is formed on a substrate surface to prepare an exhaust gas purification catalyst, wherein, in the silver carrying step, an alumina source in which the ratio of the peak intensity at a wave number of 1621 $cm^{-1}$ to the peak intensity at a wave number of 1613 $cm^{-1}$ according to the pyridine IR method is at least 0.65 is used as the alumina source, and the mixed amounts of the silver source and alumina source are adjusted so that the carried amount of the silver is 1.0 wt. % to 6.0 wt. % given 100 wt. % as the total amount of the silver alumina catalyst.

14. An exhaust gas purification catalyst according to claim 1, wherein the acid quantity of the silver alumina catalyst as measured by ammonia thermal desorption measurement is at least 0.3 mmol/g.

15. An exhaust gas purification catalyst manufacturing method for manufacturing an exhaust gas purification catalyst according to claim 14, said method comprising a silver carrying step in which a silver alumina catalyst is formed by preparing a mixture of a silver source, an alumina source, and a water-based solvent, and firing this mixture to prepare a silver alumina catalyst comprising silver carried on alumina and a catalyst layer-forming step in which a catalyst layer containing the silver alumina catalyst is formed on a substrate surface to prepare an exhaust gas purification catalyst, wherein, in the silver carrying step, an alumina source in which the ratio of the peak intensity at a wave number of 1621 $cm^{-1}$ to the peak intensity at a wave number of 1613 $cm^{-1}$ according to the pyridine IR method is at least 0.65 is used as the alumina source, and the mixed amounts of the silver source and alumina source are adjusted so that the carried amount of the silver is 1.0 wt. % to 6.0 wt. % given 100 wt. % as the total amount of the silver alumina catalyst.

16. An exhaust gas purification catalyst manufacturing method for manufacturing an exhaust gas purification catalyst according to claim 1, said method comprising a silver carrying step in which a silver alumina catalyst is formed by preparing a mixture of a silver source, an alumina source, and a water-based solvent, and firing this mixture to prepare a silver alumina catalyst comprising silver carried on alumina, and a catalyst layer-forming step in which a catalyst layer containing the silver alumina catalyst is formed on a substrate surface to prepare an exhaust gas purification catalyst, wherein, in the silver carrying step, an alumina source in which the ratio of the peak intensity at a wave number of 1621 $cm^{-1}$ to the peak intensity at a wave number of 1613 $cm^{-1}$ according to the pyridine IR method is at least 0.65 is used as the alumina source and the mixed amounts of the silver source and alumina source are adjusted so that the carried amount of the silver is 1.0 wt. % to 6.0 wt. % given 100 wt. % as the total amount of the silver alumina catalyst.

17. An exhaust gas purification catalyst of claim 1, wherein the range is between 0.42 and 0.61.

18. An exhaust gas purification catalyst of claim 1, wherein the range is between 0.65 and 1.02.

19. An exhaust gas purification catalyst of claim 1, wherein the range is greater than 0.32.

20. An exhaust gas purification catalyst according to claim 1, wherein the content of the silver is 2.0 wt. % to 6.0 wt. % given 100 wt. % as the total amount of the silver alumina catalyst.

* * * * *